March 9, 1954     H. H. HILL     2,671,428
VACUUM ACTUATED DOOR CONTROL FOR MILKING BARNS
Filed July 3, 1950
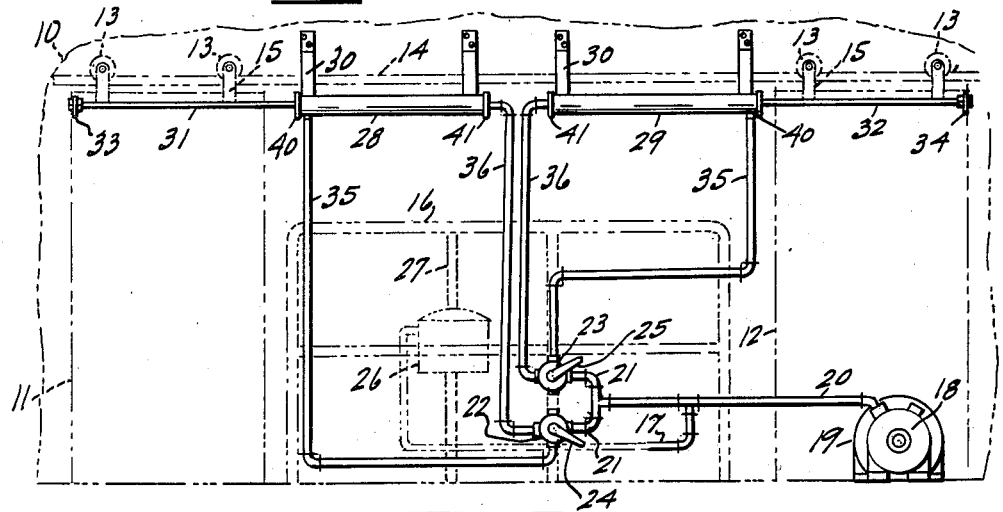
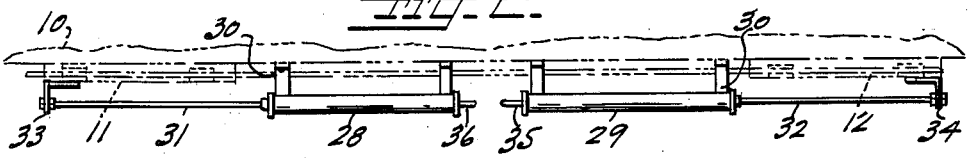
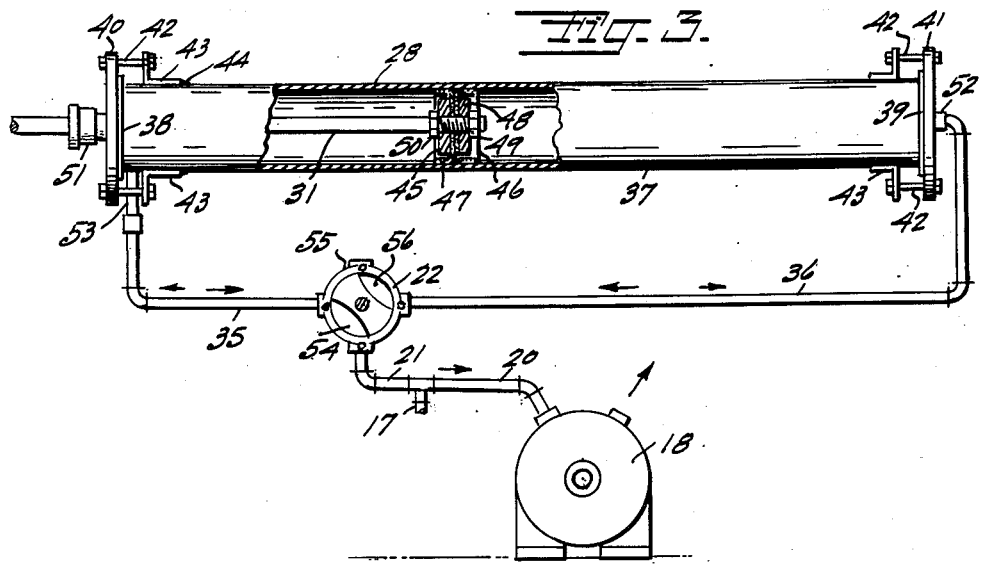
Inventor
Henry H. Hill
By Philip A. Friedell
Attorney Patented Mar. 9, 1954

2,671,428

UNITED STATES PATENT OFFICE 2,671,428

VACUUM ACTUATED DOOR CONTROL FOR MILKING BARNS

Henry H. Hill, Yreka, Calif.

Application July 3, 1950, Serial No. 171,838

1 Claim. (Cl. 119—14.03)

This invention relates to improvements in door controls for controlling entrance and exit of cows to a milking barn for mechanical milking, and relates to an operating and locking mechanism for the entrance and exit doors which is actuated by the vacuum line for the milking machines, and which permits the doors to be selectively operated and locked at will.

As is well known, mechanical milking machines are vacuum operated, one cow being permitted to enter at a time for each milking stall, the next cow not being permitted to enter until the first cow has been milked and has left the milking barn and the exit door closed.

So far as known, all door operating mechanism is either electrically operated or operated by compressed air. Electric operation has not proven satisfactory because of complicated mechanism including reversing switches and complicated wiring, quite frequently getting out of order, thus creating delays in the milking operation.

Compressed air operated mechanism requires a compressor and driving means, a tank, along with other control mechanism, thus in either case, whether electrically or compressed air operated, requiring another complete installation.

My door operating means requires a minimum in equipment, with no extra wiring, switches, or compressed air mechanism, being operated by the mechanical milker vacuum line, being merely connected in the vacuum line to the milking machines through conduits or tubing with a four way valve, vacuum jack, and communicating connections from the vacuum line to the jack for each door, thus greatly simplifying installation, greatly reducing the cost of installation and operation, and providing an instantly responsive door operator including locking means to lock the door in any desired position, closed, open, or in any intermediate position.

The objects and advantages of the invention are as follows:

First, to provide door operating means for milking stalls which are selectively operable through the existent milking machine vacuum line.

Second, to provide door operating means for a plurality of doors with the respective doors selectively operable and controlled.

Third, to provide door operating means as outlined with which any selected door can be operated to open or close to any desired degree and locked in any such position.

Fourth, to provide door operating means as outlined which requires an absolute minimum of equipment, which is simple and easy to install, convenient to operate, and economical in construction.

In describing the invention reference will be had to the accompanying drawings, in which:

Fig. 1 is a front elevation of vacuum operated door operating means as applied to an entrance and an exit door and actuated by the milking machine vacuum line.

Fig. 2 is a top plan view of Fig. 1.

Fig. 3 is an enlarged detailed illustration of the operating means partly shown in section.

The milking barn 10 is illustrated in Figs. 1 and 2 with an entrance door 11 and an exit door 12 which are supported by rollers 13 operating on a track 14, the doors being hung from the rollers as indicated at 15.

Within this barn one or more stalls 16 are provided, one for each cow to be milked at a time, and includes a vacuum line 17 for the milking machines, and the vacuum pump 18 which is driven by a suitable source of power such as the motor 19. Thus the installed vacuum line includes the vacuum pump, motor, and vacuum line such as 17—20.

The object of this invention is to operate the doors for opening and closing through connection to this same vacuum line with interposed controls, one for each door. Therefore, the line 20 is tapped by a line 21 which is connected to one or more four-way valves indicated at 22 and 23 one for each door, each valve having an operating or control lever as indicated at 24 and 25, the valve or valves being mounted on the stall adjacent to the milking machine 26 which is adjustably supported on a standard 27 of the stall.

A vacuum jack 28, 29 is provided for each door and suitably supported by the wall of the building as indicated at 30 in any suitable manner, the piston rod 31, 32 having connection with the door as indicated at 33, 34, and there being a vacuum line 35, 36 for each end of the cylinder of the jack with the pairs of lines connecting with the respective four-way valves 24 and 23.

The vacuum jack consists of a length of tubing 37 which is flanged outwardly at each end as indicated at 38 and 39 and having a head at each end, respectively 40 and 41 which are sealably bolted against the flanged ends by bolts 42 cooperating with angles 43 fixed on the cylinder 37 as by welding indicated at 44. The piston consists of two opposed cup leather packings 45 and 46 with the bottoms sandwiched between two washers 47 and 48 with the assembly secured together by nuts 49 and 50 on the piston rod 31 which operates through a packing gland 51 on one head 40, while the other head is provided with a connection 52 for the vacuum line 36, the other vacuum line 35 being connected through the side wall of the cylinder adjacent to the flange 38 as indicated at 53.

As will be noted, when the valve 22 is in the position shown in Fig. 3, suction is created in the line 20, 21, passage 54, line 35, to one end of the cylinder while atmospheric air is admitted through the inlet 55, passage 56, line 36 to the other end of the cylinder to force the piston to the left, closing the door 11. If the valve is turned through an angle of 45 degrees, or to a vertical position viewing Fig. 3, all passages in the valve will be sealed, locking the door, while if the valve is moved through 90 degrees, the vacuum will be drawn through 21, passage 22, line 36 from the other end of the cylinder while air will be admitted through passage 55, valve passage 54, line 35, to the first end of the cylinder, thus opening the door.

With a valve for each door, each door is separately controlled, so that a cow can be allowed to pass through the exit door, the door closed and the entrance door opened to admit another cow, and then closed, all from the milker's position, and no additional equipment has been required other than the jacks, vacuum lines and valves.

I claim:

A milking barn having walls provided with a sliding type entrance door and a sliding type exit door in spaced relation, a milking stall located within the barn with one end of the milking stall accessible from the entrance door, and with the other end of the milking stall accessible to the exit door, a vacuum jack for each door and selectively operatively connected to the respective doors and to the wall, a vacuum line, a four-way valve for each vacuum jack with said valves respectively having communicating connections to the respective ends of the respective vacuum jacks and each valve having a discharge opening, said four-way valves being located in said stall in a position of accessibility from a milking position for selective control of said vacuum jacks for opening and closing said doors to any desired degree at will, for selective admission and exit of animals, or for admission of fresh air into the barn while barring animals from entrance or exit through partial opening of the door or doors.

HENRY H. HILL.

References Cited in the file of this patent

UNITED STATES PATENTS

| Number | Name | Date |
|---|---|---|
| 716,783 | Sullivan et al. | Dec. 23, 1902 |
| 1,217,053 | Parish | Feb. 20, 1917 |
| 1,919,864 | Salmen et al. | July 25, 1933 |
| 2,081,947 | McCornack | June 1, 1937 |
| 2,194,747 | Giffoniello et al. | Mar. 26, 1940 |
| 2,305,259 | Jeffers, Sr. | Dec. 15, 1942 |
| 2,314,429 | Simpson | Mar. 23, 1943 |